US012485065B2

(12) United States Patent
Taylor et al.

(10) Patent No.: US 12,485,065 B2
(45) Date of Patent: Dec. 2, 2025

(54) MECHANICAL CPR DEVICE WITH ACTIVE BACKBOARD

(71) Applicant: PHYSIO-CONTROL, INC., Redmond, WA (US)

(72) Inventors: Tyson Taylor, Bothell, WA (US); Sara Lindroth, Lund (SE); Alexey Titov, Woodinville, WA (US); Anders Nilsson, Lund (SE); Fred W. Chapman, Newcastle, WA (US); Steven Chester, Kirkland, WA (US); Robert G. Walker, Seattle, WA (US); Steven B. Duke, Bothell, WA (US); Marcus Ehrstedt, Kävlinge (SE); Lars Anders Jörgen Segerstein, Staffanstorp (SE); Wiktor Kocula, Löderup (SE); Anders Jeppsson, Lund (SE); Tobias Svahn, Malmö (SE); Per Axelsson, Åkarp (SE); Jonas Lagerstrom, Fagersanna (SE)

(73) Assignee: PHYSIO-CONTROL, INC., Redmond, WA (US)

( * ) Notice: Subject to any disclaimer, the term of this patent is extended or adjusted under 35 U.S.C. 154(b) by 678 days.

(21) Appl. No.: 17/898,373

(22) Filed: Aug. 29, 2022

(65) Prior Publication Data

US 2023/0061886 A1 Mar. 2, 2023

Related U.S. Application Data

(60) Provisional application No. 63/238,509, filed on Aug. 30, 2021.

(51) Int. Cl.
*A61H 31/00* (2006.01)

(52) U.S. Cl.
CPC ......... *A61H 31/008* (2013.01); *A61H 31/006* (2013.01); *A61H 2201/5051* (2013.01); *A61H 2201/5056* (2013.01)

(58) Field of Classification Search
CPC .... A61H 31/00–008; A61H 2201/5051; A61H 2201/5056
See application file for complete search history.

(56) References Cited

U.S. PATENT DOCUMENTS

| | | | | |
|---|---|---|---|---|
| 4,168,554 | A * | 9/1979 | Hindes | A61H 31/008 5/722 |
| 10,383,789 | B1 | 8/2019 | Walker et al. | |
| 2013/0072830 | A1* | 3/2013 | Illindala | A61H 31/006 601/41 |
| 2020/0306134 | A1* | 10/2020 | Montgomery | A61H 31/006 |
| 2021/0322235 | A1* | 10/2021 | Hildenbrand | A63B 21/4045 |
| 2021/0322264 | A1* | 10/2021 | Lurie | A61F 7/12 |

* cited by examiner

*Primary Examiner* — Rachel T Sippel
(74) *Attorney, Agent, or Firm* — Miller Nash LLP

(57) ABSTRACT

An active backboard that can assist with adjusting a patient on the backboard to ensure that the backboard is correctly aligned for a compression mechanism of an upper portion of a mechanical cardiopulmonary resuscitation (CPR) device to perform compressions. The active backboard can also include multiple layers that can slide or move relative to each other to move the patient relative to the backboard. The active backboard can include roller bars, a wheel, and/or projections to assist with moving a patient relative to the backboard.

11 Claims, 5 Drawing Sheets

MECHANICAL CPR DEVICE WITH ACTIVE BACKBOARD

CROSS-REFERENCES TO RELATED APPLICATIONS

This patent application claims the benefit of U.S. provisional patent application No. 63/238,509, filed Aug. 30, 2021, the disclosure of which is incorporated herein by reference in its entirety.

BACKGROUND

In certain types of medical emergencies a patient's heart stops working. This stops the blood flow, without which the patient may die. Cardio Pulmonary Resuscitation (CPR) can forestall the risk of death. CPR includes performing repeated chest compressions to the chest of the patient so as to cause their blood to circulate some. CPR can also include delivering rescue breaths to the patient. CPR is intended to merely maintain the patient until a more definite therapy is made available, such as defibrillation.

Traditionally, CPR has been performed manually. A number of people have been trained in CPR, including some who are not in the medical professions just in case. However, manual CPR might be ineffective, and being ineffective it may lead to irreversible damage to the patient's vital organs, such as the brain and the heart.

The risk of ineffective chest compressions has been addressed with CPR chest compression machines. Such machines have been known by a number of names, for example CPR chest compression machines (CCCM), mechanical CPR devices, cardiac compressors and so on.

The correct positioning of a mechanical CPR device on a patient's chest is critical to provide effective chest compressions. However, during an emergency situation and/or with first time or rare rescuers, it can be difficult to correctly place the backboard with respect to the patient such that the upper portion of the mechanical CPR device is aligned correctly. If the upper portion is not aligned correctly, a rescuer must reposition the backboard with respect to the patient, resulting in additional time that CPR compressions are not performed. During the time a CPR chest compression machine is aligned, a patient may not be receiving manual chest compressions. The longer it takes to align the mechanical compression device can be detrimental to a patient. Often, the backboard of the mechanical CPR device is positioned first before attaching the upper portion of the mechanical CPR device. If the backboard is incorrectly positioned, it can waste valuable time having to readjust the backboard with respect to the patient.

Configurations of the disclosed technology address shortcomings in the prior art.

DETAILED DESCRIPTION

Disclosed herein are various examples of a backboard that can either move itself relative to the patient or move the patient relative to the backboard to better position the backboard for receiving an upper portion with a compression mechanism.

Figure 1:
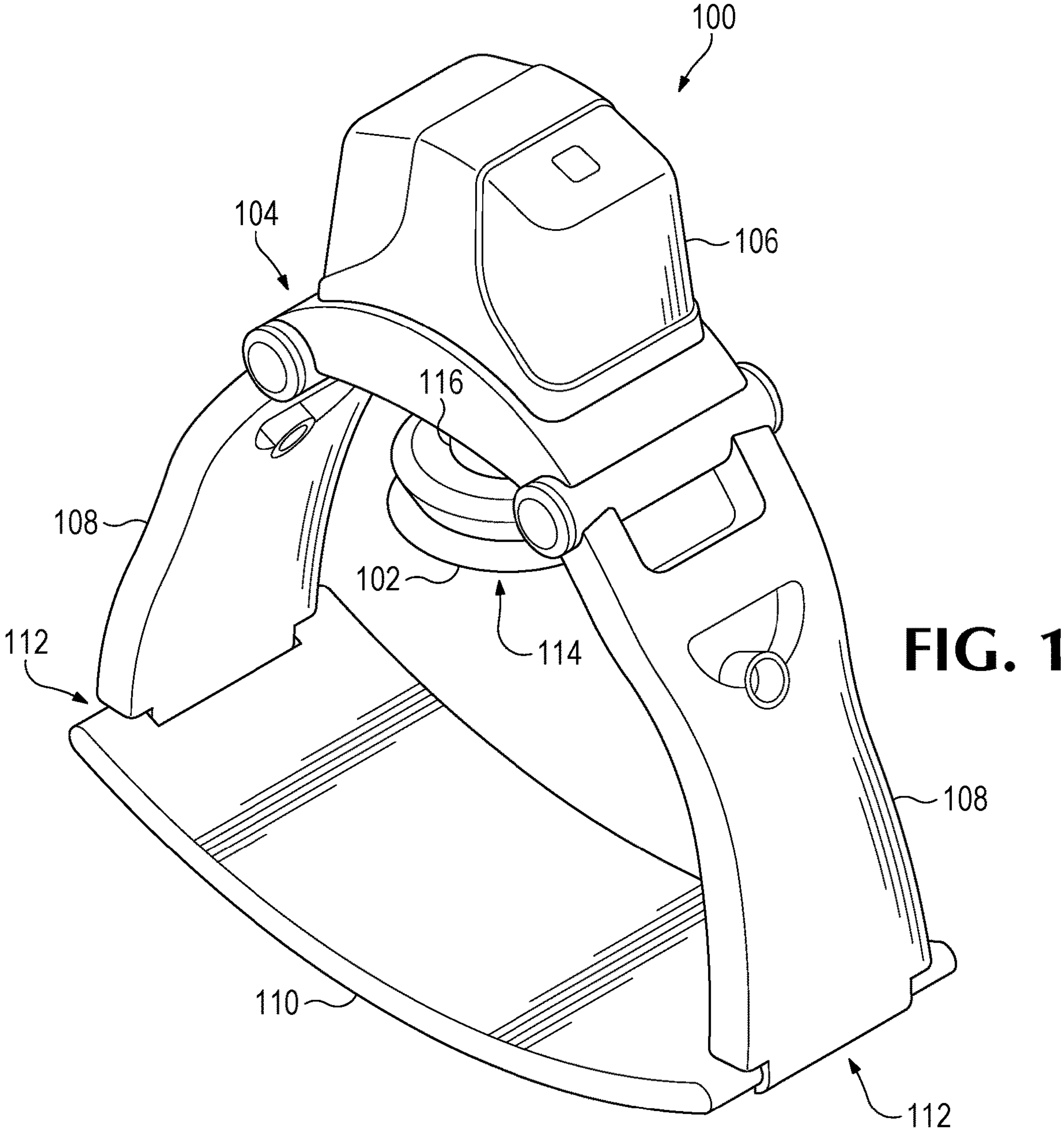
FIG. 1 is a perspective view of an example mechanical compression device.

FIG. 1 is a front view of an example CPR device 100 of FIG. 1 with an upper portion 104, also referred to herein as a support structure, and a backboard 110. While FIG. 1 is described to illustrate a mechanical compression device, examples of the disclosure are not limited to this particular type of compression device, but may be used with any compression device that utilizes a backboard attached to an upper portion when providing compressions.

As will be understood by one skilled in the art, the mechanical CPR device 100 may include additional components not shown in FIG. 1. As illustrated in FIG. 1, a CPR device 100 may include a upper portion 104 and a central unit 106. The upper portion 104 may include support legs 108 that can attach to a backboard 110. The support leg 108 and the backboard 110 meet at a junction 112 between the support leg 108 and the backboard 110. The support legs 108 can attached to first and second connectors of the backboard 110.

The support leg 108 may be configured to support central unit 106 at a distance from the backboard 110. For example, if the backboard 110 is underneath the patient, who is lying on the patient's back, then the support leg 108 may support the central unit 106 at a sufficient distance over the backboard 110 to allow the patient to lay within a space between the backboard 110 and the chest compression mechanism 114, while positioning the chest compression mechanism 114 over the patient's chest. The backboard 110 may be configured to be placed underneath the patient, for example when the patient is lying on the patient's back.

The central unit 106 is configured to deliver CPR chest compressions to the patient. The central unit 106 may include, for example, a motor-driven piston 116 configured to contact the patient's chest through the suction cup 102 to provide the CPR compressions. The central unit 106 may also include a number of electronic components to drive the motor-driven piston 116. Attached the motor-driven piston 116 is a suction cup 102 which adheres to the chest of the patient during chest compressions. The suction cup 102 can allow the motor-driven piston 116 to lift the chest back to a resting height, or provide a full decompression of the chest of the patient, when the motor-driven piston 116 is retracted from an extended position.

Figure 2:
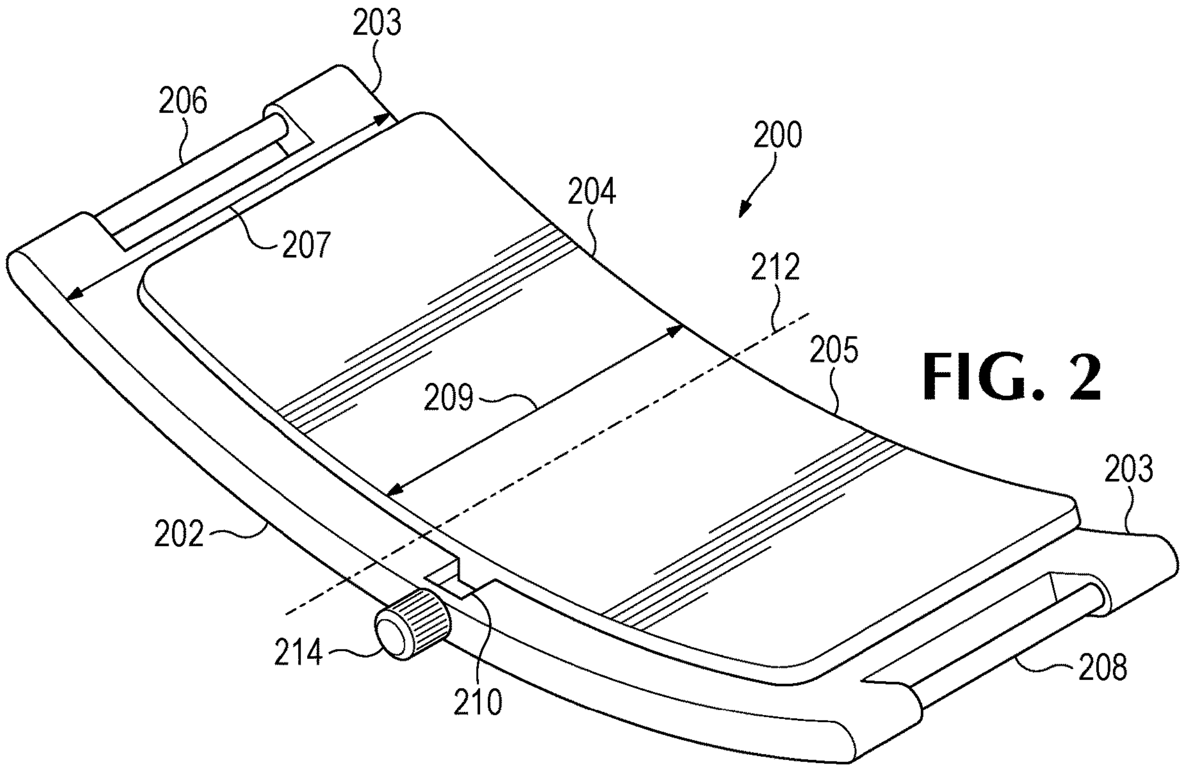
FIG. 2 is a perspective view of an example active backboard having two layers according to some examples of the disclosure.

FIG. 2 illustrates an alternative active backboard 200 to the backboard 110 shown in FIG. 1. The active backboard 200 of FIG. 2 can be used instead of the backboard 110 in FIG. 1 and may attach to the support legs 108 in the same or a similar fashion.

The active backboard 200 can include two layers 202 and 204 which are stacked, but can move relative to each other. The first layer 202 includes an elongated portion that extends along an axis from a first connector 206 at a first end to a second connector 208 at a second end that is opposite the first end. The connectors 206 are structured to couple to the upper portion 104, for example at the support legs 108.

The layers 202 and 204 can move relative to each other using any known means. For example, one or more rollers may be attached between the layers 202 and 204 to facilitate movement between the layers. Or, as illustrated in FIG. 2, the layer 204 may be on a track 210 to move relative to the layer 202. While only a small portion of the track 210 is shown for illustration, the layer 204 can move beyond the upper and lower edges of layer 202. For example, the locking mechanism 214 may be placed in a different position, and the layer 204 can move relative to the layer 202 such that almost the entirety of layer 202 may be visible when layer 204 is positioned at an extreme end of layer 202. Stated another way, the edge 205 of the layer 204 may extend beyond the corresponding edge 203 of the layer 202 when the layer 202 is slid into an extended configuration. Further, the layers 202 and 204 may be made of materials with low friction to allow for easy sliding between the layers.

The second layer 204 also includes an elongated portion that is adjacent to the first layer 202. The elongated portion of the second layer 204 extends along the same axis as the elongated portion of the first layer 202. The second layer 204 is slidable relative to a surface of the first elongated portion along an axis 212 that is perpendicular to the axis defined by the elongated portions. Thus, the direction of movement is along the axis 212.

The active backboard 200 can include a locking mechanism 214 to lock the second layer 204 relative to the first layer 202. The locking mechanism 214 can be located anywhere on the active backboard 200. For example, the active backboard 200 can be positioned behind the patient. However, if the active backboard 200 is not positioned correctly, rather than lifting the patient to readjust the backboard, as a rescuer would have to do with the backboard 110 of FIG. 1, the second layer 204 of the active backboard 200 can slide relative to the first layer 202 of the active backboard 200 to position the patient in the correct position. Once the patient is at the desired position, then the locking mechanism 214 can be engaged to lock the second layer 204 relative to the first layer 202 to prevent movement of the patient during compressions.

The locking mechanism 214 can be any locking mechanism that can prevent the second layer 204 moving relative to the first layer 202. For example, the locking mechanism 214 may be a ball bearing that is engaged to prevent movement of the second layer 204 along the track 210. As another example, the locking mechanism 214 may be a pneumatic locking mechanism or hydraulic mechanism. The locking mechanism 214 can be engaged by pushing a button, rotating a dial, etc.

While FIG. 2 illustrates the connectors 206 and 208 combined with the first layer 202, examples of the disclosure are not limited into his configuration. In some examples, the connectors 206 and 208 may be combined with the second layer 204 and move with the second layer 204.

Further, while FIG. 2 generally shows the first layer 202 and the second layer 204 as the same size, examples of the disclosure are not limited to this configuration. Rather, the first layer 202 and the second layer 204 may be different lengths 207, 209 in the direction of movement.

Figure 3:
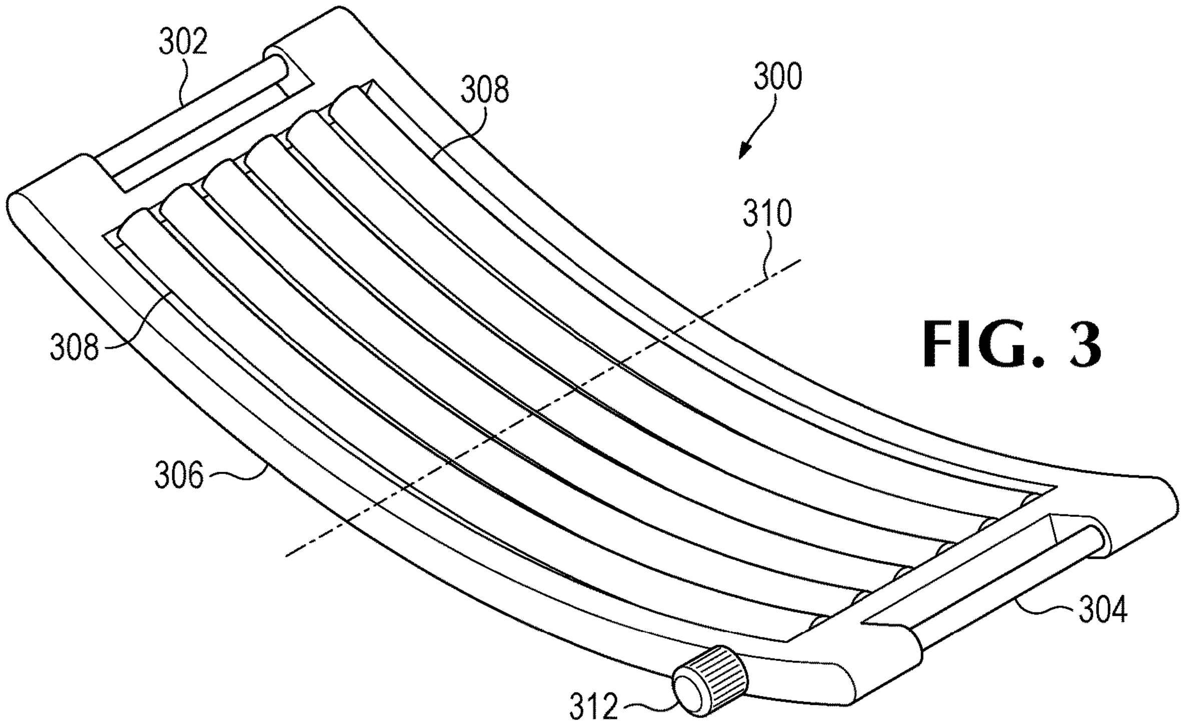
FIG. 3 is a perspective view of an example active backboard with roller bars according to some examples of the disclosure.

In other examples of the disclosure, the backboard can include a position adjustment mechanism either to assist in moving the patient relative to the backboard or move itself relative to the patient and the surface. FIG. 3 illustrates an active backboard 300 with a position adjustment mechanism.

Similar to the active backboard 200, the active backboard 300 can include a first connector 302 that is structured to couple to a first support leg 108 of an upper portion 104. The active backboard 300 also includes a second connector 304 structured to couple to a second support leg 108 of the upper portion 104. An elongated portion 306 of the active backboard 300 extends along an axis between the first connector 302 and the second connector 304.

The position adjustment mechanism of the active backboard 300 includes roller bars 308. The roller bars 308 rotate along the axis extending between the first connector 302 and the second connector 304, as shown in FIG. 3, to facilitate moving the patient on an axis 310 perpendicular to the axis extending between the first connector 302 and the second connector 304. The active backboard 300 can be positioned behind a patient and then the roller bars 308 can be disengaged so that the roller bars 308 freely move or roll.

The roller bars 308 can be disengaged a number of different ways. For example, a locking mechanism 312 may be provided which can either prevent the roller bars 308 from moving freely, or that can retract the roller bars 308 below a surface of the backboard 300. In such an example, the roller bars 308 may extend from the backboard 300 to adjust the patient and then can be retracted back into the backboard 300 during compressions to prevent the patient from moving.

Once the locking mechanism 312 has been disengaged, the patient and/or backboard can then be adjusted by sliding the backboard 300 or by sliding the patient along the roller bars 308. Although roller bars 308 are shown, any type of conveyor type movement may be used, including a conveyer belt. For example, the backboard 300 may contain a conveyor belt that can be operated to move the patient along the axis 310.

Figure 4:
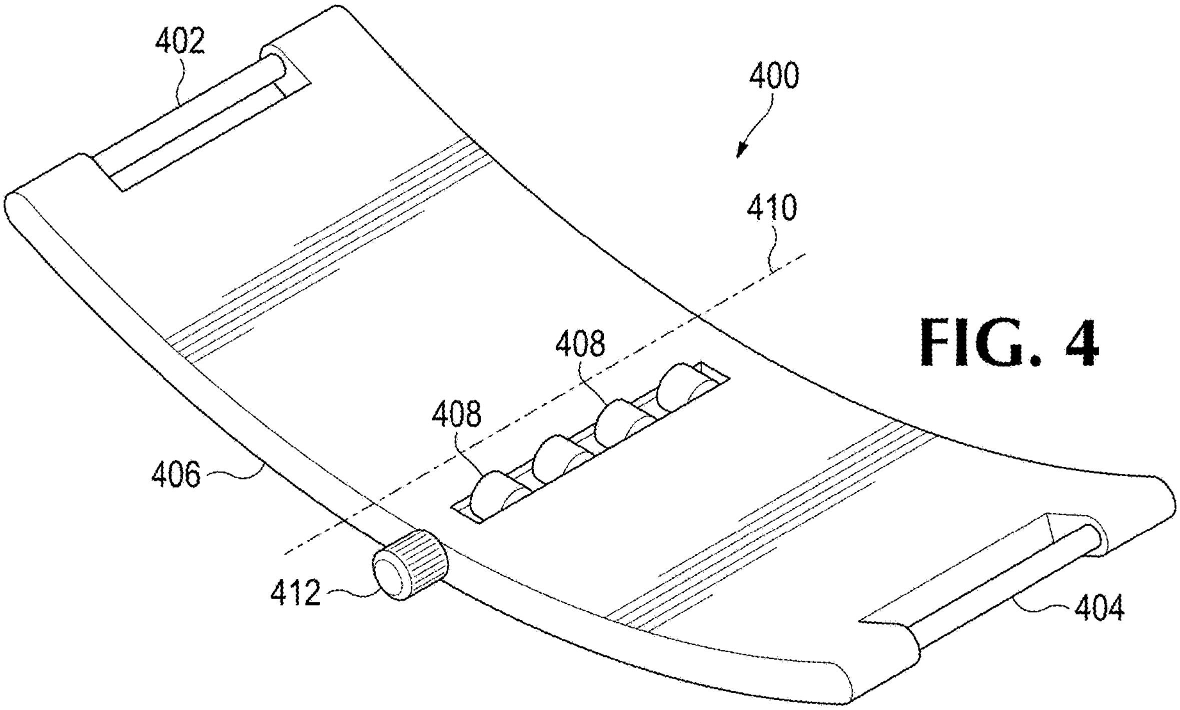
FIG. 4 is a perspective view of an example active backboard with a retractable wheel according to some examples of the disclosure.

FIG. 4 illustrates another active backboard 400 with a position adjustment mechanism. Similar to the active backboards 200 and 300, the active backboard 400 shown in FIG. 4 can include a first connector 402 that is structured to couple to a first support leg 108 of a upper portion 104. The active backboard 400 also includes a second connector 404 structured to couple to a second support leg 108 of the upper portion 104. An elongated portion 406 of the active backboard 400 extends along an axis between the first connector 302 and the second connector 304.

The position adjustment mechanism of the active backboard 400 includes one or more wheels 408. While FIG. 4 illustrates four wheels 408, any number of wheels may be provided in the backboard 400, including a single wheel. The wheels 408 can rotate along the axis extending between the first connector 402 and the second connector 404 to facilitate moving the patient on an axis 410 perpendicular to the axis extending between the first connector 402 and the second connector 404.

The backboard 400 can include a locking mechanism 412. The locking mechanism 412 can either prevent the wheels 408 from rotating and/or can retract the wheels 408 below the surface of the elongated portion 406 of the backboard 400.

Once the locking mechanism 412 has been disengaged, the patient can be adjusted by sliding the patient with the wheels 408 along the axis 410. The wheels 408 pushes the patient up relative to the backboard 410 and rotates with the movement of the patient to assist with adjusting the position of the backboard 400 relative to the patient without having to completely lift the patient off the backboard 400.

Figure 5:
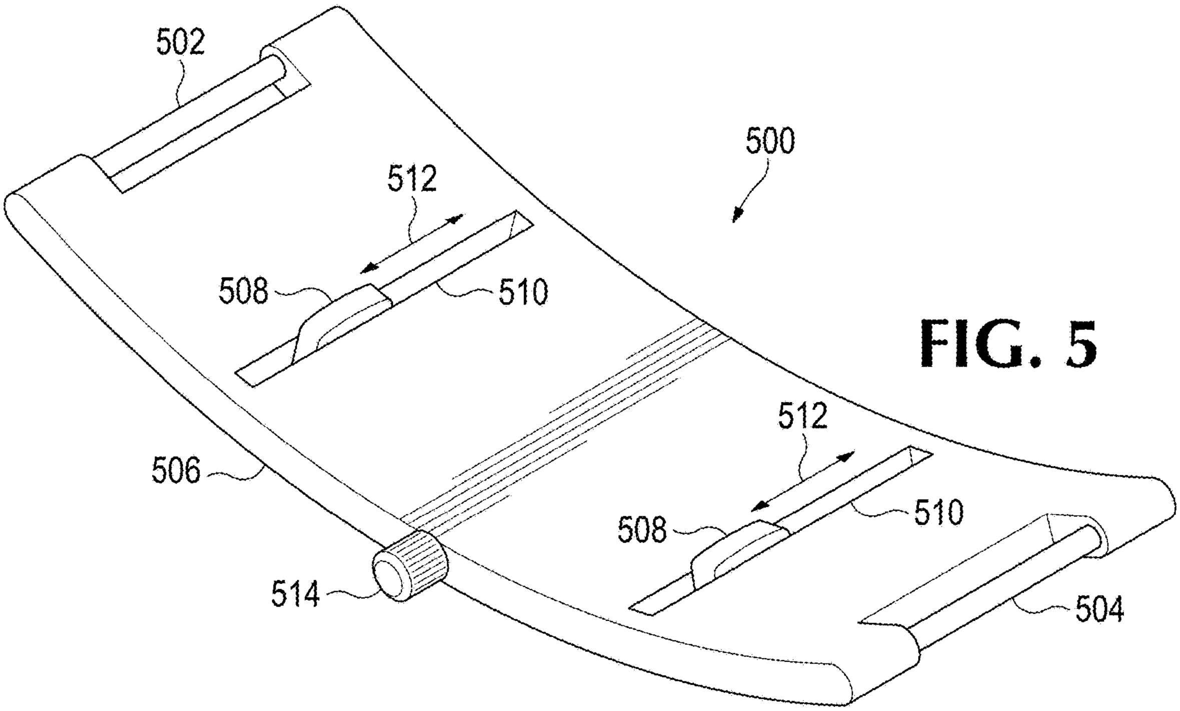
FIG. 5 is a perspective view of an example active backboard with projections according to some examples of the disclosure.

FIG. 5 illustrates another active backboard 500 with a position adjustment mechanism. Similar to the active backboards above, the active backboard 500 shown in FIG. 5 can include a first connector 502 that is structured to couple to a first support leg 108 of an upper portion 104. The active backboard 500 also includes a second connector 504 structured to couple to a second support leg 108 of the upper portion 104. An elongated portion 506 of the active backboard 500 extends along an axis between the first connector 502 and the second connector 504.

The position adjustment mechanism of the active backboard 500 includes one or more projections 508 that can extend up from the surface of the elongated portion 506 and move along a track 510 in the direction of arrows 512. While FIG. 5 illustrates two different projections 508, any number of projections may be used, including a single projection.

During operation of the backboard 500, the projections 508 can extend up from a surface of the elongated portion 506 to engage with a patient. The projections 508 may include a surface with a higher coefficient of friction to engage with the patient. The projections 508 can then move along the track 510 in the direction of arrows 512. With the projections 508 extended, the projections move along the track 510 while moving the patient in the same direction. When the projections 508 get to the end of the track 510, the projections 508 retract back into the backboard 500 and move to their initial starting position.

If the patient needs to be moved further, the projections 508 can extend again from the starting position and move the patient further, before retracting back into the backboard 500.

The projections 508 can be operated by using a knob 514. For example, for each push of the knob 514, the projections may move the patient the length of the track 510. However, the projections 508 do not need to move the entirety of the track 510, but may move in shorter lengths than the track 510. For example, it may be desirable to have the projections 508 only adjust the patient a small amount, which may be done by having the projections 508 move along only a fraction of the track 510 before retracting into the backboard 500 and returning to their original position in the track 510. Multiple knobs 514 may be provided, one to move the patient in one direction and the other to move the patient in the opposite direction.

In some examples, rather than moving the backboard under the patient, as described in the various examples above, the backboard may be able to adjust the compression position of the upper portion 104 in the head to toe direction of the patient.

Figure 6:
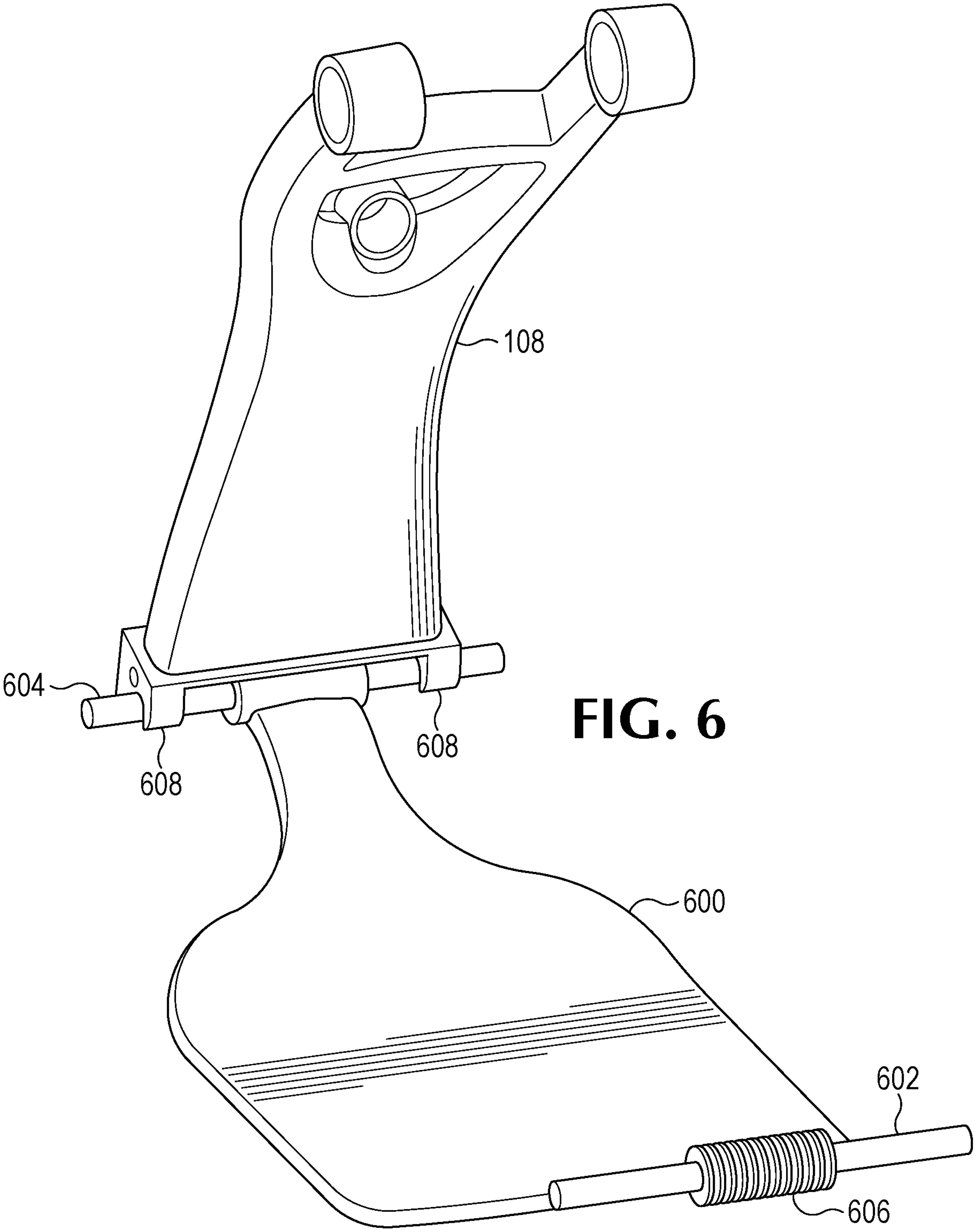
FIG. 6 is a perspective view of an example backboard according to some examples of the disclosure and a portion of a support leg.

FIG. 6 illustrates an example backboard 600 that can allow for the compression position of the upper portion 104 to be adjusted. Similar to the backboards above, the backboard 600 can include two connectors 602 and 604 which are structured to couple to a support leg 108 of the upper portion 104. The connectors 602 and 604 are sized to allow the support legs 108 to attach at multiple points along the connectors 602 and 604.

For ease of illustration, FIG. 6 only shows one support leg 108 of the upper portion 104. However, as will be understood by one skilled in the art, the upper portion 104 can include one or two support legs 108, each leg connecting to a respective connectors 602 and 604. In some examples, the backboard 600 may include only one connector 602 if the upper portion 104 includes only a single support leg 108. In other examples, the backboard 600 may be universal and include both connectors 602 and 604, even if the upper portion 104 includes only one support leg 108.

Each of the connectors 602 and 604 include a number of indentations 606 toward the center of the connectors 602 or 604. The connectors 602 and 604 each include shafts on opposite sides of the indentations 606. The indentations 606 interact with corresponding indentations, shown in FIG. 7 discussed below, to prevent the upper portion 104 from moving in the axial direction, or in the head to toe direction, during compressions and/or decompressions. The indentations 606 are equally spaced from each other.

The support leg 108 can include two claw-like members 608 that can couple to or clamp the shafts of the connectors 602 and 604. The claw-like members 608 are small enough that they can be placed at multiple positions along the connectors 602 and 604. While claw-like members 608 are shown, any attachment members may be used to attach the support leg 108 to the connectors 602 and 604, such that the attachment members can attach at multiple points along the connectors 602 and 604.

Figure 7:
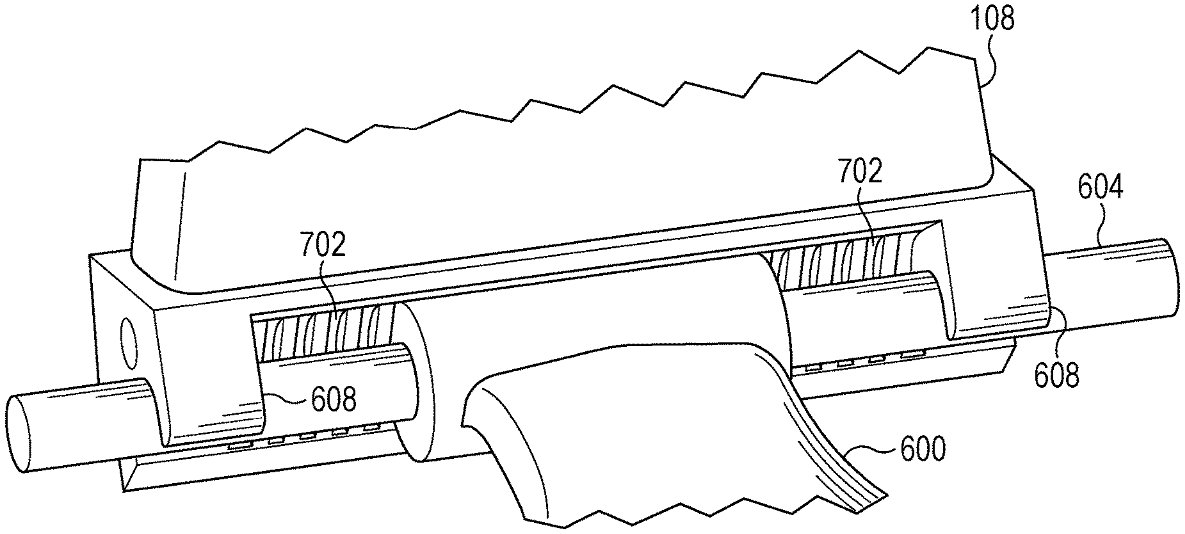
FIG. 7 is a close-up view of the support leg interacting with the backboard of FIG. 6.

FIG. 7 illustrates a close-up view of the support leg 108 attached to the connector 604. As will be understood by one of ordinary skill in the art, the other support leg 108 would be identical to the support leg 108 shown in FIG. 7 and interact with connector 602 in the same manner. Although not seen in FIG. 7, the connector 604 includes a number of indentations 606 as shown on the connector 602 in FIG. 6. The support leg 108 includes indentations 702 that correspond to the indentations 606. The indentations 702 extend between the two claw-like members 608 of the support leg 108. The indentations 702 on the support leg 108 and the indentations 606 on the connectors 602 and 604 interact to prevent movement of the upper portion 104 along the connectors 602 and 604. That is, the walls of the indentations 702 will fit within the cavities of the indentations 606 and vice versa to prevent movement of the support leg 108.

To place the mechanical CPR device on a patient, a rescuer will put the backboard 600 behind the patient. The rescuer can then attach the upper portion 104 to the backboard by connecting the support legs 108 to the connectors 602 and 604 of the backboard 600. If needed, the rescuer can detach the upper portion 104 from the connectors 602 and 604 and reposition the upper portion either toward the head of the patient or the feet of the patient, so that the upper portion 104 is off-centered from a central position over the backboard 600. This can allow the rescuer to reset the location of the upper portion 104 even if the backboard is not aligned correctly without having to adjust the backboard 600 itself.

Additionally or alternatively, the claw-like members 608 can include indents rather than, or in addition to, the indentations 702 shown in FIG. 7. In such an example, the connectors 602 and 604 can include indentations 606 along the entirety or near entirety of the connectors 602 and 604. The claw-like members 608 can then engage with the connectors 602 and 604 along at any position along the connectors. Alternatively, the indentations 606 can be spaced to be slightly larger than each claw-like member 608, and a number of indentations 606 are provided along the connectors 602 and 604. In such an example, a user can connect the claw-like members 608 at an indent along any portion of the connectors 602 and 604. This can allow adjustability of the upper portion 104, while also preventing movement during operation of the upper portion 104. Further, in any of the examples discussed above, more than one connector 602 or 604 may be provided on one side of the backboard 600 at different heights to allow for the support legs 108 to attach at different heights, while also allowing for the adjustment of the upper portion 104 in the head to toe direction of the patient.

Figure 8:
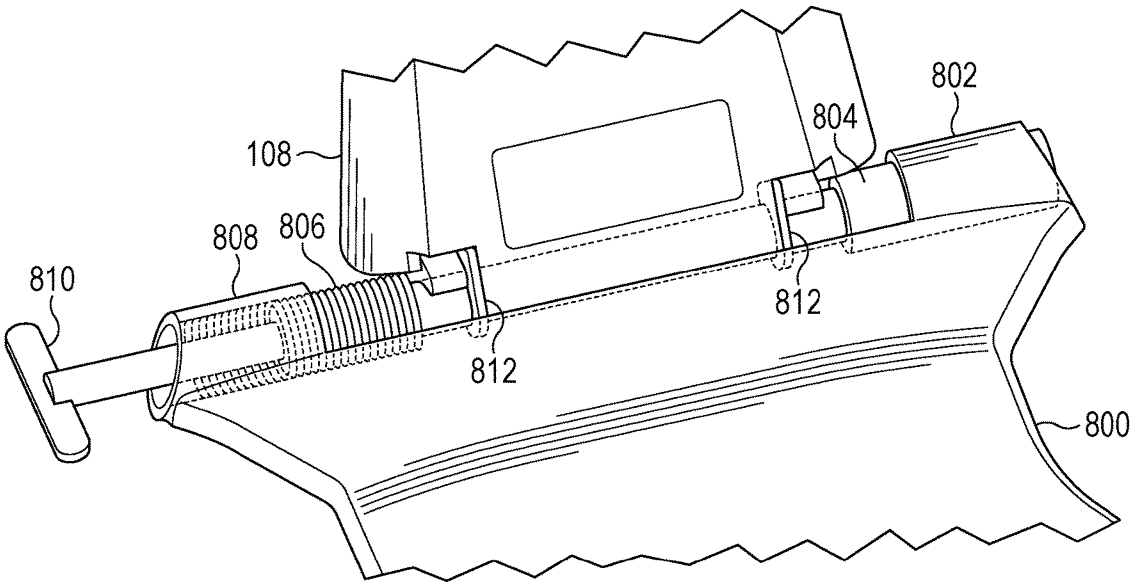
FIG. 8 is a close-up view of a portion of a support leg and another example backboard according to some example of the disclosure.

FIG. 8 illustrates another backboard 800 that can adjust the compression point. For ease of illustration, FIG. 8 only shows one connector 802 and a portion of a support leg 108 of the upper portion 104. However, as will be understood by one skilled in the art, in some examples, the backboard 800 can include another connector identical to the connector 802 on the opposite side of the backboard 800.

The connector 802 includes a shaft 804 with a threaded portion 806. The connector 802 also includes a threaded opening 808 to receive the threaded portion 806 of the shaft 804. The shaft 804 can include a handle 810 to rotate the shaft 804.

The shaft 804 also includes two stops 812 which define a portion of the shaft 804 to receive the support leg 108, as shown in FIG. 8. The stops 812 prevent the upper portion 108 from sliding along the shaft 804 during compressions.

Initially, a rescuer can place the backboard 800 behind the back of a patient. The upper portion 104 can then be attached to the connectors 802 between the stops 812. If the compression point of the upper portion 104 is not aligned correctly on the chest, a rescuer can slide the shaft 804 of the connector 802 in an axial direction, either toward the head of the patient or the toes of the patient.

In the example shown in FIG. 8, the shaft 804 can be rotated so that the threads 806 of the shaft 804 interact with the threaded opening 808 to move the shaft 804 and consequently the upper portion 104. Both shafts 804 can be adjusted to change the compression position and relocate the upper portion 104 relative to the patient. The example of FIG. 8 can adjust the compression point without having to detach the upper portion 104.

While a screw mechanism is shown for moving the shaft 804 relative to the backboard 800, examples of the disclosure are not limited to a screw mechanism, and any mechanism can be used that can slide the shaft 804 to adjust the compression position of the upper portion 104. For example, the shaft 804 may not include any threaded portion and can slide relative to the backboard 800 in the head to toe direction of the patient, and then a locking mechanism may be used to lock the shaft 804 in place during the compressions.

In some examples, the shaft 804 may be provided on the support leg 108. That is, the support leg 108 would include one or more threaded openings to allow the shaft 804 to move relative to the support leg 108. The backboard 800 may connect or attach to the shaft 804 in the support leg 108, and the shaft 804 can be rotated or otherwise moved to adjust the location of the backboard 800 relative to the patient and the support leg 108. That is, rather than moving the upper portion 104 along the shaft 804, the backboard 800 would attach between the two stops 812 and the backboard 800 can be adjusted along the shaft 804 within the support legs 108.

As will be understood by one skilled in the art, for each of the example configurations discussed above and illustrated in FIGS. 2-8, the upper portion 104 can include one or two support legs 108, each leg connecting to a respective connector on the backboard 200, 300, 400, 500, 600, or 800. In some examples, the backboard may include only one connector if the upper portion 104 includes only a single support leg 108. In other examples, the backboard may include both connectors, even if the upper portion 104 includes only one support leg 108.

Examples

Illustrative examples of the disclosed technologies are provided below. A particular configuration of the technologies may include one or more, and any combination of, the examples described below.

Example 1 includes a backboard for a mechanical cardiopulmonary resuscitation (CPR) device, comprising: a first elongated portion extending along a first axis from a first connector at a first end to a second end opposite the first end, the first connector being structured to couple to an upper portion of a mechanical CPR device; and a second elongated portion adjacent to the first elongated portion, the second elongated portion being slidable relative to a surface of the first elongated portion along a second axis that is perpendicular to the first axis, defining a direction of movement.

Example 2 includes the backboard of Example 1, further comprising a locking mechanism configured to lock the second elongated portion along the second axis relative to the first elongated portion.

Example 3 includes the backboard of Example 2, wherein the locking mechanism includes a pneumatic mechanism.

Example 4 includes the backboard of Example 2, wherein the locking mechanism includes a hydraulic mechanism.

Example 5 includes the backboard of any of Examples 2-4, wherein the locking mechanism is configured to be engaged by a pushbutton.

Example 6 includes the backboard of any of Examples 2-4, wherein the locking mechanism is configured to be engaged by rotating a dial.

Example 7 includes the backboard of any of Examples 1-6, wherein the first elongated portion includes a track, in which the second elongated portion is slidable within the track.

Example 8 includes the backboard of Example 7, further comprising a locking mechanism configured to lock the second elongated portion along the second axis relative to the first elongated portion, the locking mechanism including a ball bearing configured to prevent movement of the second elongated portion along the track.

Example 9 includes the backboard of any of Examples 1-8, wherein the second elongated portion includes a track, in which the first elongated portion is slidable within the track.

Example 10 includes the backboard of Example 9, further comprising a locking mechanism configured to lock the first elongated portion along the second axis relative to the second elongated portion, the locking mechanism including a ball bearing configured to prevent movement of the first elongated portion along the track.

Example 11 includes the backboard of any of Examples 1-10, wherein an edge of the second elongated portion extends beyond a corresponding edge of the first elongate portion when the second elongated portion is slid into an extended configuration.

Example 12 includes the backboard of any of Examples 1-11, wherein the first elongated portion further comprises a second connector at the second end of the first elongated portion, the second connector being structured to couple to the upper portion of the mechanical CPR device.

Example 13 includes the backboard of any of Examples 1-12, wherein the first elongated portion has a width in a direction of movement that is less than a width of the second elongated portion in the direction of movement.

Example 14 includes the backboard of any of Examples 1-12, wherein the second elongated portion has a width in a direction of movement that is less than a width of the first elongated portion in the direction of movement.

Example 15 includes a backboard for a mechanical cardiopulmonary resuscitation (CPR) device, comprising: a first connector structured to couple to a first leg of an upper unit; a second connector structured to couple to a second leg of an upper unit; an elongated portion extending along an axis between the first connector and the second connector; and a position adjustment mechanism structured to adjust a patient position on the elongated portion.

Example 16 includes the backboard of Example 15, wherein the position adjustment mechanism includes a roller bar.

Example 17 includes the backboard of Example 16, further including a locking mechanism structured to lock the roller bar.

Example 18 includes the backboard of any of Examples 15-17, wherein the position adjustment mechanism includes at least one wheel.

Example 19 includes the backboard of Example 18, wherein the wheel is retractable within the elongated portion.

Example 20 includes the backboard of any of Examples 15-19, wherein the position adjustment mechanism includes a projection that extends from the elongated portion and a motor configured to cause the projection to move relative to the elongated portion.

Example 21 includes the backboard of Example 20, wherein the axis is a first axis and the projection extends from the elongated portion and moves along a second axis perpendicular to the first axis.

Example 22 includes a backboard for a mechanical cardiopulmonary resuscitation (CPR) device, comprising: a first connector structured to couple to a first leg of an upper unit, the first connector including a plurality of indentations structured to interact with corresponding indentations of the first leg; and a second connector structured to couple to a second leg of the upper unit, the first connector including a plurality of indentations structured to interact with corresponding indentations of the first leg.

Example 23 includes a mechanical cardiopulmonary resuscitation (CPR) device, comprising: a backboard including two connectors, each connector including a plurality of indentations; a central unit; and two support legs extending from the central unit, each support leg attachable to a respect connector of the backboard and each support leg including a plurality of indentations structured to interact with the plurality of indentations of the backboard.

Example 24 includes the mechanical CPR device of Example 23, wherein the plurality of indentations of each support leg extend between two claw-like members structured to attach to shafts of the respective connector.

Example 25 includes a backboard for a mechanical cardiopulmonary resuscitation (CPR) device, comprising: a first connector structured to couple to a first leg of an upper unit, the first connector including: a first adjustable shaft, and two stops attached to the first adjustable shaft defining an attachment point of the first leg of the upper unit; and a second connector structured to couple to a second leg of an upper unit, the second connector including: a second adjustable shaft, and two stops attached to the second adjustable shaft defining an attachment point of the second leg of the upper unit.

Example 26 includes the backboard of Example 25, wherein the first adjustable shaft includes a threaded portion and the first connector further includes a first threaded opening to receive the threaded portion of the first adjustable shaft to adjust the first adjustable shaft, and wherein the second adjustable shaft includes a threaded portion and the second connector further includes a second threaded opening to receive the threaded portion of the second adjustable shaft to adjust the second adjustable shaft.

For purposes of this description, certain aspects, advantages, and novel features of the examples of this disclosure are described herein. Features, integers, characteristics, compounds, chemical moieties or groups described in conjunction with a particular aspect, configuration, or example of the disclosure are to be understood to be applicable to any other aspect, configuration or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms “a”, “an”, and “at least one” encompass one or more of the specified element. That is, if two of a particular element are present, one of these elements is also present and thus “an” element is present. The terms “a plurality of” and “plural” mean two or more of the specified element. “Generally” or “approximately” as used herein means a variance of 10%.

As used herein, the term “and/or” used between the last two of a list of elements means any one or more of the listed elements. For example, the phrase “A, B, and/or C” means “A,” “B,” “C,” “A and B,” “A and C,” “B and C,” or “A, B, and C.”

As used herein, the term “coupled” generally means physically coupled or linked and does not exclude the presence of intermediate elements between the coupled items absent specific contrary language.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A backboard for a mechanical cardiopulmonary resuscitation (CPR) device, comprising:

a first elongated portion extending along a first axis from a first connector at a first end to a second end opposite the first end, the first connector being structured to couple to an upper portion of the mechanical CPR device;

a second elongated portion adjacent to the first elongated portion, the second elongated portion being slidable relative to a surface of the first elongated portion along a second axis that is perpendicular to the first axis, defining a direction of movement; and a locking mechanism configured to lock the second elongated portion along the second axis relative to the first elongated portion.

2. The backboard of claim 1, wherein the locking mechanism includes a pneumatic mechanism.

3. The backboard of claim 1, wherein the locking mechanism includes a hydraulic mechanism.

4. The backboard of claim 1, wherein the locking mechanism is configured to be engaged by a pushbutton.

5. The backboard of claim 1, wherein the locking mechanism is configured to be engaged by rotating a dial.

6. A backboard for a mechanical cardiopulmonary resuscitation (CPR) device, comprising:

a first elongated portion extending along a first axis from a first connector at a first end to a second end opposite the first end, the first connector being structured to couple to an upper portion of the mechanical CPR device; and a second elongated portion adjacent to the first elongated portion, the second elongated portion being slidable relative to a surface of the first elongated portion along a second axis that is perpendicular to the first axis, defining a direction of movement;

wherein the first elongated portion includes a track, in which the second elongated portion is slidable within the track.

7. The backboard of claim 6, further comprising a locking mechanism configured to lock the second elongated portion along the second axis relative to the first elongated portion, the locking mechanism including a ball bearing configured to prevent movement of the second elongated portion along the track.

8. A backboard for a mechanical cardiopulmonary resuscitation (CPR) device, comprising:

a first elongated portion extending along a first axis from a first connector at a first end to a second end opposite the first end, the first connector being structured to couple to an upper portion of the mechanical CPR device; and a second elongated portion adjacent to the first elongated portion, the second elongated portion being slidable relative to a surface of the first elongated portion along a second axis that is perpendicular to the first axis, defining a direction of movement;

wherein the second elongated portion includes a track, in which the first elongated portion is slidable within the track.

9. The backboard of claim 8, further comprising a locking mechanism configured to lock the first elongated portion along the second axis relative to the second elongated portion, the locking mechanism including a ball bearing configured to prevent movement of the first elongated portion along the track.

10. A backboard for a mechanical cardiopulmonary resuscitation (CPR) device, comprising:

a first elongated portion extending along a first axis from a first connector at a first end to a second end opposite the first end, the first connector being structured to couple to an upper portion of the mechanical CPR device; and a second elongated portion adjacent to the first elongated portion, the second elongated portion being slidable relative to a surface of the first elongated portion along a second axis that is perpendicular to the first axis, defining a direction of movement;

wherein the first elongated portion has a width in the direction of movement that is less than a width of the second elongated portion in the direction of movement.

11. A backboard for a mechanical cardiopulmonary resuscitation (CPR) device, comprising:

a first elongated portion extending along a first axis from a first connector at a first end to a second end opposite the first end, the first connector being structured to couple to an upper portion of the mechanical CPR device; and a second elongated portion adjacent to the first elongated portion, the second elongated portion being slidable relative to a surface of the first elongated portion along a second axis that is perpendicular to the first axis, defining a direction of movement;

wherein the second elongated portion has a width in a direction of movement that is less than a width of the first elongated portion in the direction of movement.

* * * * *